United States Patent
Hong et al.

(10) Patent No.: US 10,551,829 B2
(45) Date of Patent: Feb. 4, 2020

(54) CONTEXT RECOGNITION APPARATUS AND METHOD

(71) Applicant: Samsung Electronics Co., Ltd., Gyeonggi-do (KR)

(72) Inventors: Hyun-Su Hong, Gyeonggi-do (KR); Jae-Myeon Lee, Gyeonggi-do (KR); Ji-Heon Oh, Gyeonggi-do (KR); Kyong-Ha Park, Gyeonggi-do (KR); Sung-Min Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 122 days.

(21) Appl. No.: 15/664,752

(22) Filed: Jul. 31, 2017

(65) Prior Publication Data

US 2017/0357228 A1  Dec. 14, 2017

Related U.S. Application Data

(63) Continuation of application No. 13/845,679, filed on Mar. 18, 2013, now Pat. No. 9,720,389.

(30) Foreign Application Priority Data

Apr. 3, 2012 (KR) .......................... 10-2012-0034346

(51) Int. Cl.
*G06F 19/00* (2018.01)
*G05B 23/02* (2006.01)
(Continued)

(52) U.S. Cl.
CPC .......... *G05B 23/0221* (2013.01); *G05B 15/02* (2013.01); *H04W 52/0277* (2013.01)

(58) Field of Classification Search
CPC .............. G05B 15/02; G05B 23/0221; H04W 52/0277; Y02D 70/164; Y02D 70/142
See application file for complete search history.

(56) References Cited

U.S. PATENT DOCUMENTS 5,423,045 A      6/1995  Kannan
2009/0135002 A1*  5/2009  Blinnikka .......... G08B 13/1427
                                                    340/539.13
(Continued)

FOREIGN PATENT DOCUMENTS

CN        101978748       2/2011
KR        1020060058581   5/2006
(Continued)

OTHER PUBLICATIONS

Kosuke Nishihara et al: "Power Saving in Mobile Devices Using Context-Aware Resource Control", 2010 First International Conference on Networking and Computing (ICNC), Nov. 17, 2010, 7 pages.

(Continued)

*Primary Examiner* — Michael D Masinick
(74) *Attorney, Agent, or Firm* — The Farrell Law Firm, P.C.

(57) ABSTRACT

Context recognition methods and apparatus are provided for an application processor and a micro control unit. It is determined whether an operation switch condition for switching to a sleep mode is satisfied. A request for execution of a context recognition function is sent to a micro control unit, when the operation switch condition is satisfied. The application processor switches to the sleep mode, when the context recognition function is executed by the micro control unit. The micro control unit collects sensor data at previously stored time intervals, and previously stored state information is updated based on the sensor data.

18 Claims, 8 Drawing Sheets

(51) Int. Cl.
*G05B 15/02* (2006.01)
*H04W 52/02* (2009.01)

(56) References Cited

U.S. PATENT DOCUMENTS

| | | | |
|---|---|---|---|
| 2009/0259865 A1* | 10/2009 | Sheynblat | G06F 1/3203 |
| | | | 713/323 |
| 2010/0013778 A1 | 1/2010 | Liu | |
| 2010/0127919 A1* | 5/2010 | Curran | G01S 19/40 |
| | | | 340/573.4 |
| 2010/0235667 A1 | 9/2010 | Mucignat | |
| 2010/0313050 A1 | 12/2010 | Harrat | |
| 2012/0095622 A1* | 4/2012 | Lynch | B64C 25/00 |
| | | | 701/3 |
| 2012/0154292 A1 | 6/2012 | Zhao | |
| 2013/0082939 A1 | 4/2013 | Zhao | |
| 2013/0261769 A1 | 10/2013 | Hong | |
| 2014/0059365 A1 | 2/2014 | Heo | |
| 2014/0073252 A1* | 3/2014 | Lee | H04M 1/72522 |
| | | | 455/41.2 |
| 2014/0119256 A1 | 5/2014 | Kim | |
| 2014/0143569 A1* | 5/2014 | Banerjee | G06F 1/3287 |
| | | | 713/323 |
| 2014/0145860 A1 | 5/2014 | Park | |
| 2014/0154986 A1* | 6/2014 | Lee | H04B 7/26 |
| | | | 455/41.2 |
| 2014/0342670 A1* | 11/2014 | Kang | H04W 24/08 |
| | | | 455/41.2 |
| 2014/0342671 A1* | 11/2014 | Kim | H04W 4/02 |
| | | | 455/41.3 |
| 2017/0185717 A1 | 6/2017 | Williams et al. | |

FOREIGN PATENT DOCUMENTS

| | | |
|---|---|---|
| KR | 1020070018423 | 2/2007 |
| KR | 1020100118693 | 11/2010 |
| KR | 1020110030274 | 3/2011 |
| WO | WO 2009/151753 | 12/2009 |

OTHER PUBLICATIONS

European Search Report dated Feb. 19, 2016 issued in counterpart application No. 13162047.8-1855, 10 pages.
Korean Office Action dated Feb. 19, 2018 issued in counterpart application No. 10-2012-0034346, 13 pages.
Chinese Office Action dated Jul. 28, 2017 issued in counterpart application No. 201310115472.7, 16 pages.

\* cited by examiner

CONTEXT RECOGNITION APPARATUS AND METHOD

PRIORITY

This application is a continuation of U.S. patent application Ser. No. 13/845,679, which was filed on Mar. 18, 2013 and claims priority under 35 U.S.C. § 119(a) to a Korean Patent Application filed in the Korean Intellectual Property Office on Apr. 3, 2012 and assigned Serial No. 10-2012-0034346, the entire disclosure of which is incorporated herein by reference.

BACKGROUND OF THE INVENTION

1. Field of the Invention

The present invention relates generally to a context recognition function using a sensor in a mobile communication terminal, and more particularly, to a context recognition apparatus and method that can minimize power consumption of a mobile communication terminal while continuously recognizing a context (or circumstances) by using a sensor.

2. Description of the Related Art

Portable terminals that can be carried and provide various functions, such as, for example, mobile communication terminals, Personal Digital Assistants (PDAs), smart phones, etc., are widely used.

A context recognition technique for recognizing a context of a terminal and a current state of a user or the terminal has been developed. The context recognition technique continuously senses a context of the terminal and a current state of the user or terminal by using various sensors provided in the terminal. The context recognition technique provides various types of data, corresponding to the sensing result, to the user. For example, the context recognition technique tracks, in real time, a moving path of a terminal, and displays the moving path on a map on a display, such as, for example, a touch screen.

For continuous context recognition in a portable terminal, context recognition has to be performed continuously without a break, and context information, corresponding to 24 hours per day, must be recorded. A portable terminal implements a continuous context recognition function by using an Application Processor (AP). Specifically, the portable terminal implements the continuous context recognition function by driving, in real time, an AP capable of performing a high-speed operation and a large number of computations at a time. However, the portable terminal, by its nature, operates with a limited battery capacity. When the portable terminal executes the context recognition function by using an AP, the battery of the portable terminal may be rapidly exhausted due to the significant power consumption of the AP. In particular, the context recognition function is usually performed in real time for a long period of time, such that the battery of the portable terminal is likely to be discharged within a few hours.

SUMMARY OF THE INVENTION

The present invention has been made to address at least the above problems and/or disadvantages and to provide at least the advantages described below. Accordingly, an aspect of the present invention provides a context recognition apparatus and method that can minimize power consumption of a mobile communication terminal while continuously recognizing a context by using a sensor.

According to an aspect of the present invention, a context recognition method is provided for an application processor. It is determined whether an operation switch condition for switching to a sleep mode is satisfied. A request for execution of a context recognition function is sent to a micro control unit, when the operation switch condition is satisfied. The application processor switches to the sleep mode, when the context recognition function is executed by the micro control unit.

According to another aspect of the present invention, a context recognition method is provided for a micro control unit. A request for execution of a context recognition function is received from an application processor, when the application processor satisfies an operation switch condition for switching to a sleep mode. Sensor data is collected at previously stored time intervals. Previously stored state information is updated based on the sensor data.

According to another aspect of the present invention, a context recognition apparatus is provided. The context recognition apparatus includes an application processor for determining whether an operation switch condition for switching to a sleep mode is satisfied, sending a request for execution of a context recognition function to a micro control unit when the operation switch condition is satisfied, and switching to the sleep mode. The context recognition apparatus also includes the micro control unit for, when the application processor switches to the sleep mode, executing the context recognition function to receive sensor data from at least one sensor at preset time intervals, and updating state information based on the received sensor data.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
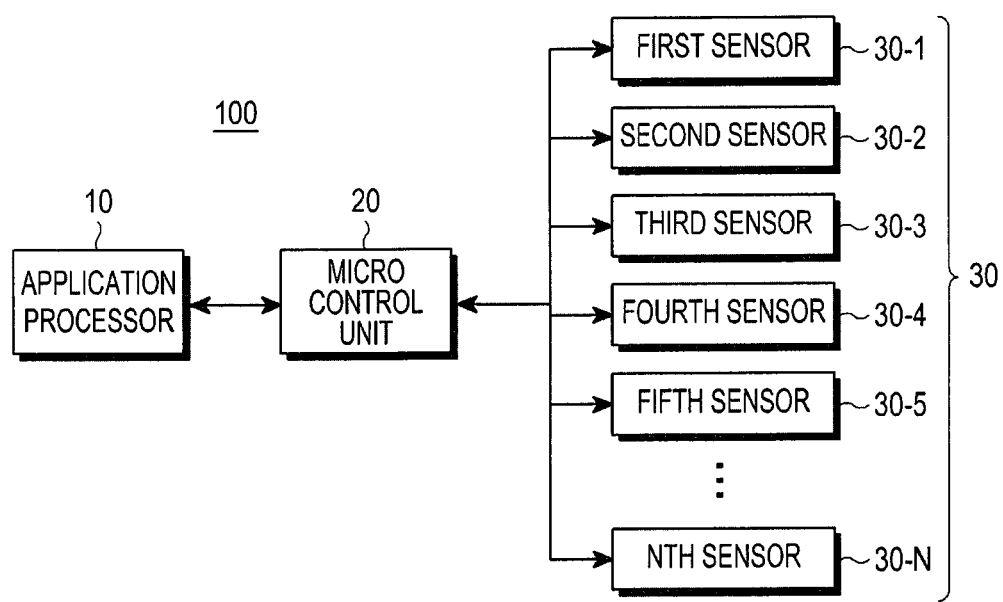
FIG. 1 is a block diagram illustrating a context recognition apparatus in a mobile communication terminal, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a block diagram illustrating a context recognition apparatus in a mobile communication terminal, according to an embodiment of the present invention.

Referring to FIG. 1, a context recognition apparatus 100 includes an application processor 10, a micro control unit 20, and a sensor unit 30.

The application processor 10 controls overall operation of the context recognition apparatus 100. If a particular event is difficult to handle by the micro control unit 20 during current-state recognition of the context recognition apparatus 100, the application processor 10 handles the particular event according to an embodiment of the present invention.

The application processor 10, according to an embodiment of the present invention, determines whether an operation switch condition for switch to a sleep mode is satisfied. If the operation switch condition is satisfied, the application processor 10 switches to the sleep mode. If the remaining battery capacity is less than a previously stored threshold value, if there is no more user input for a previously stored time, or when a mobile communication terminal 1000 (See FIG. 5) is powered on, the operation switch condition may be satisfied. The operation switch condition may be set by an input of a user who uses the mobile communication terminal 1000.

The application processor 10 may check the remaining battery capacity of the mobile communication terminal 1000. The application processor 10 determines whether the remaining battery capacity is less than a threshold. If the remaining battery capacity is less than the threshold, the application processor 10 switches to the sleep mode to minimize an operation, thus reducing power consumption. According to another embodiment of the present invention, the application processor 10 may switch to the sleep mode from an operation mode.

The application processor 10 may previously compute an expected amount of power to be consumed after the current time (or an expected power consumption amount) and an expected remaining battery capacity corresponding to the expected power consumption amount. If the expected remaining battery capacity is less than the threshold, the application processor 10 may switch from the operation mode to the sleep mode.

For example, it is assumed that the current remaining battery capacity is 50% when the remaining battery capacity corresponding to a full-charged state of the battery is 100%. It is also assumed that a threshold to switch the application processor 10 to the sleep mode is 30%, and when the operation mode is maintained, the remaining battery capacity is reduced to 25% after 2 hours. At the current time, the remaining battery capacity does not reach the threshold, and the application processor 10 maintains the operation mode. However, the application processor 10 previously computes an expected remaining battery capacity after 2 hours, i.e., 25%, and switches to the sleep mode at the current time while the remaining battery capacity is 50%. Thus, the mobile communication terminal 1000, according to an embodiment of the present invention, may reduce power consumption that occurs as the application processor 10 maintains the operation mode, and a usage time of the mobile communication terminal 1000 may be substantially lengthened.

The application processor 10, according to another embodiment of the present invention, may switch to the sleep mode immediately after a power-on operation of the mobile communication terminal 1000, or after an elapse of a previously stored first reference time from the power-on operation of the mobile communication terminal 1000. Immediately after the power-on operation of the mobile communication terminal 1000, the context recognition function of the micro control unit 20 is driven, such that the mobile communication terminal 1000, according to an embodiment of the present invention, may minimize battery consumption caused by driving the application processor 10.

The application processor 10 may also switch to the sleep mode if a user input, inputted to the mobile communication terminal 1000, does not occur within a previously stored second reference time.

According to an embodiment, the application processor 10 maintains the sleep mode in a default state and upon receiving an operation mode switch request from the micro control unit 20, switches to the operation mode. The application processor 10 may switch from the sleep mode to the operation mode or from the operation mode to the sleep mode every previously-stored third reference time. For example, the application processor 10 may have an operating cycle of maintaining the sleep mode for 1 hour, maintaining the operation mode for 5 minutes, and then maintaining the sleep mode for 1 hour.

The application processor 10, which maintains the sleep mode, may switch from the sleep mode to the operation mode if a re-switch condition for re-switch to the operation mode is satisfied. If a previously stored threshold time, i.e., the third reference time, has elapsed since switching to the sleep mode, if a user input inputted to the mobile communication terminal 1000 occurs, or if a request for re-switch to the operation mode is received from the micro control unit 20, then the re-switch condition may be satisfied.

The micro control unit 20 may receive sensor data from the sensor unit 30 and generate or update state information based on the collected sensor data. According to an embodiment of the present invention, the micro control unit 20 may perform the foregoing operations, specifically, receive the sensor data from the sensor unit 30 and generate or update state information, if the application processor 10 switches to the sleep mode.

The 'state information' refers to data indicating a current state of the mobile communication terminal 1000 or a user who uses the mobile communication terminal 1000, and may be generated or updated by the application processor 10.

If an event that cannot be handled by the micro control unit 20 occurs in the context recognition apparatus 100, the micro control unit 20 may send a request for a switch to the operation mode to the application processor 10. For example, when a location of a user who uses the mobile communication terminal 1000 has to be displayed on a display screen of the mobile communication terminal 1000, the micro control unit 20 may send a request for a switch to the operation mode to the application processor 10. According to another embodiment of the present invention, the micro control unit 20 may send a request for a switch to the operation mode to the application processor 10 if sensor data received from the sensor unit 30 is not easy to handle, for example, when an expected error range of the sensor data exceeds a preset reference error. The application processor 10 may receive the sensor data from the micro control unit 20 and correct an error. The application processor 10 may receive state information from the micro control unit 20 to correct an error of state information and resend the error-corrected state information to the micro control unit 20.

The sensor unit 30 includes first through $N^{th}$ sensors 30-1, 30-2, 30-3, 30-4, 30-5, ..., 30-N. Each of the first through $N^{th}$ sensors 30-1, 30-2, 30-3, 30-4, 30-5, ..., 30-N shown in FIG. 1 recognizes a current state, generates sensor data based on the recognized state, and forwards the sensor data to the micro control unit 20.

The 'current state' recognized by the sensor unit 30 refers to an acceleration of the mobile communication terminal 1000 measured by an accelerometer which may be, for example, the first sensor 30-1. The sensor unit 30 may generate and output the measured data, i.e., sensor data.

For example, it is assumed that the second sensor 30-2 is a thermometer and the third sensor 30-3 is a barometer. The second sensor 30-2 may generate, as sensor data, temperature data, which is a measurement of a temperature of a place where the context recognition apparatus 100 is located, and output the sensor data to the micro control unit 20. The third sensor 30-3 may generate, as sensor data, atmospheric pressure data, which is a measurement of an atmospheric pressure of the place where the context recognition apparatus 100 is located, and output the sensor data to the micro control unit 20.

In another embodiment of the present invention, it is assumed that the fourth sensor 30-4 is a gyroscope, the fifth sensor 30-5 is an infrared sensor, and the sixth sensor 30-6 is a motion recognition sensor. The context recognition apparatus 100 of the mobile communication terminal 1000 may recognize a user's motion, e.g., a user's action of grabbing the mobile communication terminal 1000 placed on the floor or covering or rubbing the display screen of the mobile terminal 1000 by hand. Before the user's motion is recognized by the sensor unit 30, the application processor 10 of the context recognition apparatus 100 may maintain the sleep mode. Once the user's motion is sensed, the micro control unit 20 may send a request for a switch to the operation mode to the application processor 10, which maintains the sleep mode. Thus, the application processor 10 switches from the sleep mode to the operation mode, and the application processor 10 having switched to the operation mode controls the mobile communication terminal 1000 based on the user's motion. For example, the application processor 10 having switched to the operation mode may switch the display screen from the OFF state to the ON state to allow the user to check a standby screen of the mobile communication terminal 1000.

Figure 2:
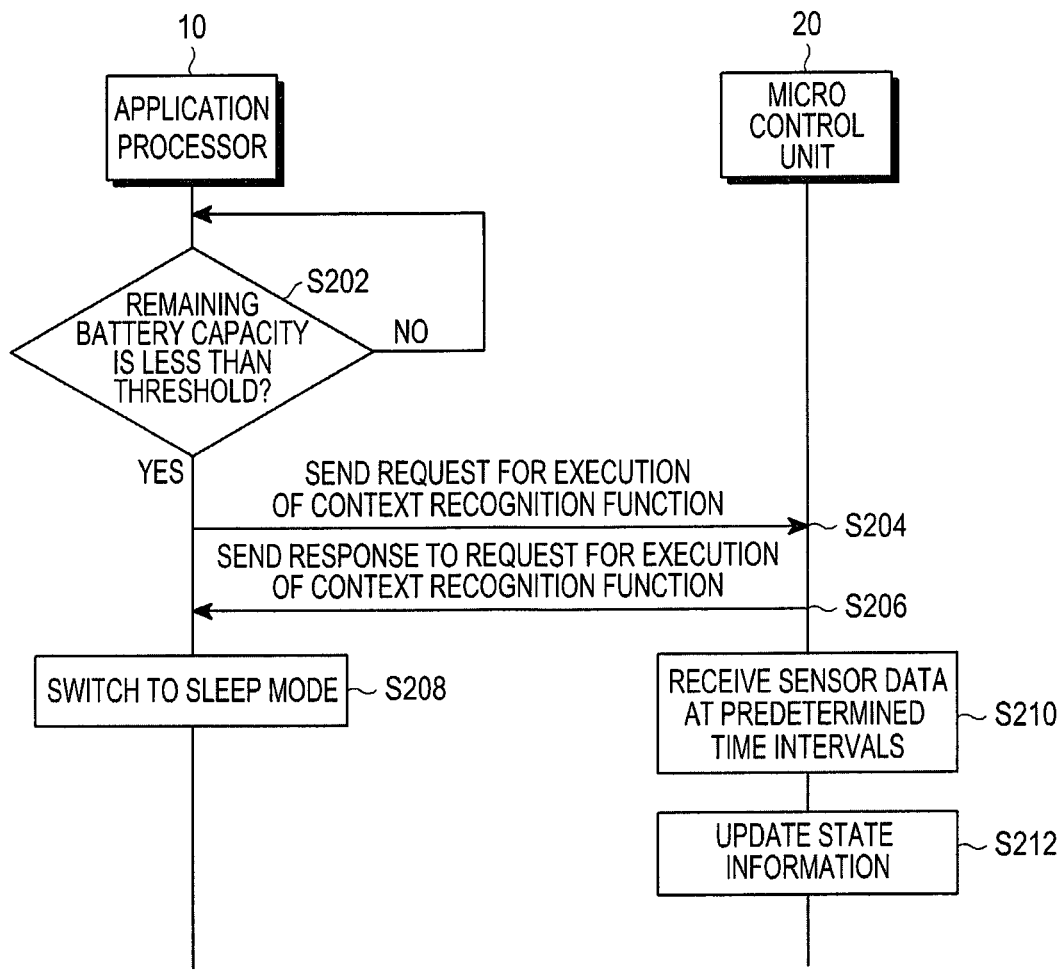
FIG. 2 is a flowchart illustrating a context recognition method in the context recognition apparatus of FIG. 1, according to an embodiment of the present invention.

FIG. 2 is a flowchart illustrating a context recognition method in the context recognition apparatus 100 of FIG. 1, according to an embodiment of the present invention. In FIG. 2, the application processor 10 is assumed to be executing the context recognition function.

Referring to FIG. 2, the application processor 10 determines whether the remaining battery capacity of the mobile communication terminal 1000 is less than the threshold, in step S202. According to an embodiment of the present invention, the application processor 10 may check the remaining battery capacity of the mobile communication terminal 1000 every previously-stored first reference time.

If the application processor 10 determines that the remaining battery capacity is greater than or equal to the threshold (NO in step S202), the application processor checks the remaining battery capacity again after the previously stored first reference time. If the application processor 10 determines that the remaining battery capacity is less than the threshold (YES in step S202), then the application processor 10 requests the micro control unit 20 to execute the context recognition function, in step S204. Specifically, the application processor 10 may generate an execution request message and transmit the execution request message to the micro control unit 20.

The micro control unit 20, having received the execution request message for the context recognition function, sends a response to the execution request message to the application processor 10, in step S206. Upon receiving the response to the execution request message, the application processor 10 switches its current state into the sleep mode, in step S208. The 'sleep mode' refers to a state in which the application processor 10 performs only a minimal operation. The application processor 10, according to an embodiment of the present invention, stops executing the context recognition function upon entering the sleep mode.

The micro control unit 20 collects sensor data at predetermined time intervals, in step S210. According to an embodiment of the present invention, the micro control unit 20 may receive sensor data generated by each of the sensors 30-1, 30-2, 30-3, ..., 30-N included in the sensor unit 30 from the sensor unit 30 at predetermined time intervals. The micro control unit 20 updates state information based on the collected sensor data, in step S212. In an embodiment of the present invention, it is assumed that the state information is generated by the application processor 10. The application processor 10 may also send the state information together with the request for execution of the context recognition function to the micro control unit 20, in step S204.

State information' refers to data recognized by the context recognition apparatus 100 as a current context of the mobile communication terminal 1000 or the user. For example, the state information may include a current location of the mobile communication terminal 1000, an angle of the mobile communication terminal 1000, and a current temperature, a current humidity, a current atmospheric pressure, and an altitude of a place in which the mobile communication terminal 1000 is located.

If it is determined that the remaining battery capacity exceeds or is equal to the threshold (NO in step S202), the application processor 10 may maintain the current state. According to an embodiment of the present invention, when the application processor 10 is in the sleep mode, if the remaining battery capacity exceeds the threshold, then the application processor 10 may switch to the operation mode.

Figure 3:
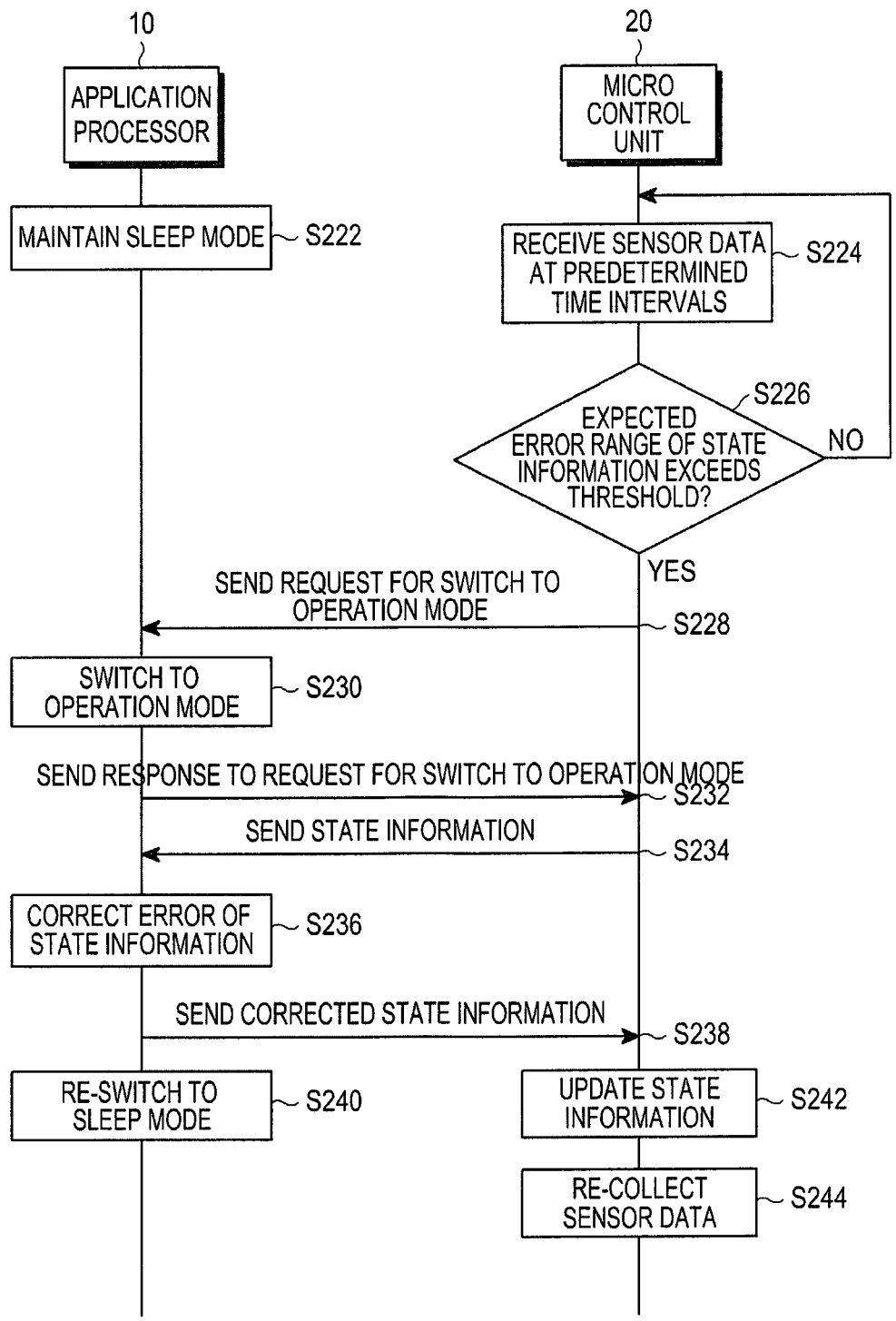
FIG. 3 is a flowchart illustrating a context recognition method in the context recognition apparatus of FIG. 1, according to another embodiment of the present invention.

FIG. 3 is a flowchart illustrating a context recognition method in the context recognition apparatus 100 of FIG. 1, according to another embodiment of the present invention. In FIG. 3, it is assumed that the application processor 10 maintains the sleep mode.

When the application processor 10 is in the sleep mode in step S222, the micro control unit 20 collects sensor data at predetermined time intervals, in step S224. In an embodiment of the present invention, the micro control unit 20 receives sensor data from each of the first through $N^{th}$ sensors 30-1 through 30-N included in the sensor unit 30 every previously-stored time.

The micro control unit 20 determines whether an expected error range of state information exceeds a threshold, i.e., a reference error, in step S226. If an error of the sensor data is less than the threshold (NO in step S226), then the micro control unit 20 continues collecting the sensor data in step S224, and according to an embodiment of the present invention, may generate state information based on the collected sensor data or update the state information received from the application processor 10.

If the sensor data exceeds the threshold (YES in step S226), the micro control unit 20 sends a request for a switch to the operation mode to the application processor 10, in step S228.

The application processor 10 switches from the sleep mode to the operation mode in step S230, and sends a response to the request for the switch to the operation mode to the micro control unit 20, in step S232. The micro control unit 20 sends state information, or sensor data, to the application processor 10, in step S234. The application processor 10 processes the sensor data, and may correct an error of the sensor data, in step S236. The application processor sends the error-corrected sensor data to the micro control unit 20, in step S238.

Specifically, the application processor 10 of the context recognition apparatus 100, according to an embodiment of the present invention, may switch to the operation mode to process the sensor data only when the micro control unit 20 cannot process the sensor data. For example, if the error of the sensor data sent to the micro control unit 20 exceeds a previously stored error allowable range, i.e., the reference error, the application processor 10 switches to the operation mode from the sleep mode to correct the error of the sensor data.

The application processor 10 re-switches to the sleep mode, in step S240. The micro control unit 20 receives the corrected state information from the application processor 10 and updates previously stored state information with the received state information, in step S242. The micro control unit 20 re-collects sensor data from the sensor unit 30, in step S244.

Figure 4:
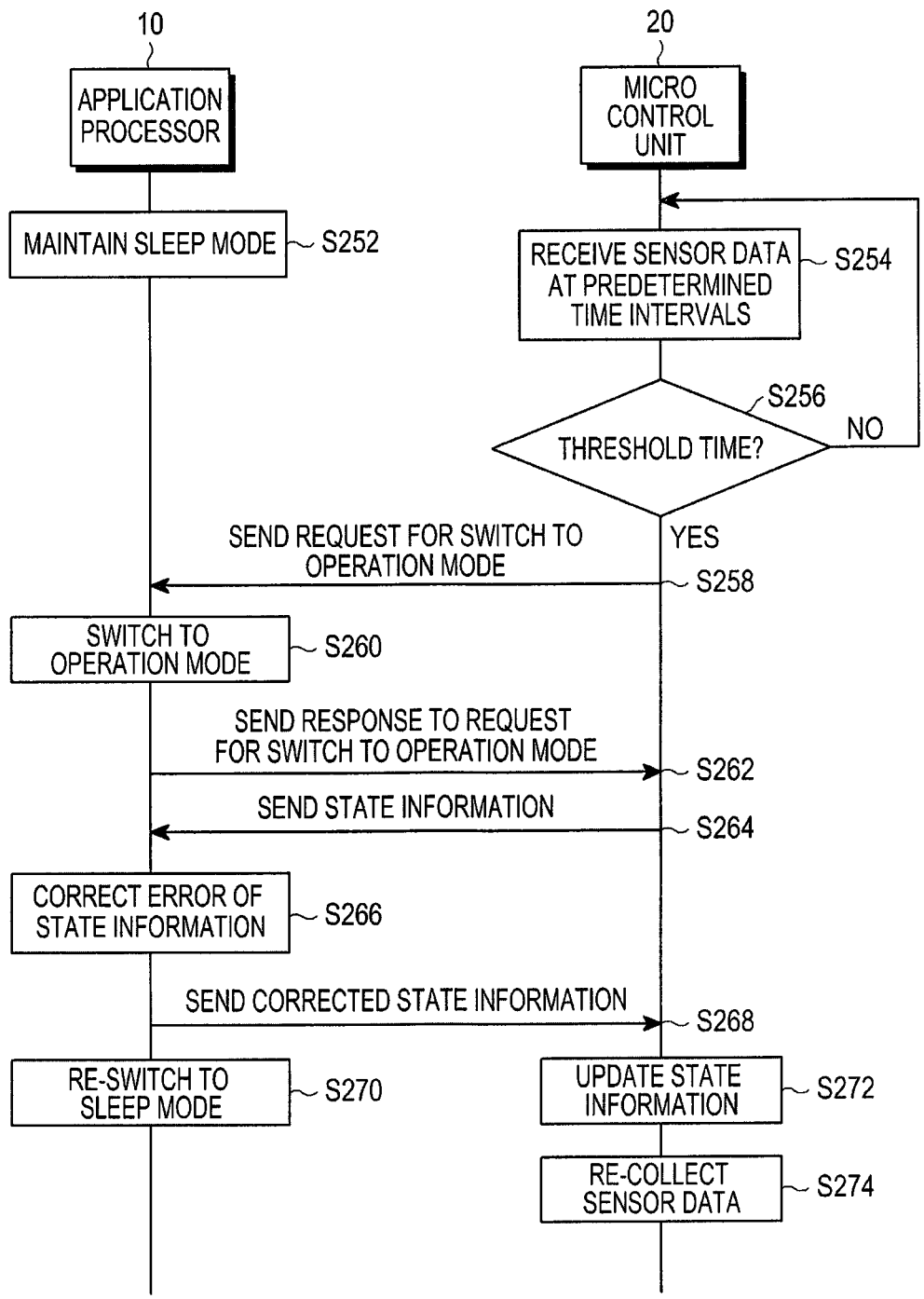
FIG. 4 is a flowchart illustrating a context recognition method in the context recognition apparatus of FIG. 1, according to another embodiment of the present invention.

FIG. 4 is a flowchart illustrating a context recognition method in the context recognition apparatus 100 of FIG. 1, according to another embodiment of the present invention. In FIG. 4, like in FIG. 3, it is assumed that the application processor 10 maintains the sleep mode.

When the application processor 10 is in the sleep mode, in step S252, the micro control unit 20 collects sensor data at predetermined time intervals, in step S254. In an embodiment of the present invention, the micro control unit 20 receives sensor data from each of the first through $N^{th}$ sensors, 30-1 through 30-N, included in the sensor unit every previously stored time.

The micro control unit 20 determines whether the time reaches a threshold time, in step S256. The threshold time may be the third reference time corresponding to a switch cycle in which the application processor 10 switches from the sleep mode to the operation mode.

If the time does not reach the threshold time (NO in step S256), the micro control unit 20 continues receiving the sensor data, in step S254, and according to an embodiment of the present invention, may generate state information based on the received sensor data or update the state information received from the application processor 10.

If the time reaches the threshold time (YES in step S256), the micro control unit 20 sends a request for a switch to the operation mode to the application processor 10, in step S258.

The application processor 10 switches from the sleep mode to the operation mode, in step S260, and sends a response to the request for switch to the operation mode to the micro control unit 20, in step S262. The application processor 10 receives state information from the micro control unit 20, in step S264, and corrects an error in the state information, in step S266. Thus, the application processor 10 of the context recognition apparatus 100, according to an embodiment of the present invention, switches from the sleep mode to the operation mode every previously stored time to correct the error of the state information, thereby improving the accuracy of the state information generated or updated by the micro control unit 20.

The application processor 10 sends the corrected state information to the micro control unit 20, in step S268, and re-switches to the sleep mode, in step S270. The micro control unit 10 updates previously stored state information with the state information received from the application processor 10, in step S272. The micro control unit 20 re-collects sensor data, in step S274.

Figure 5:
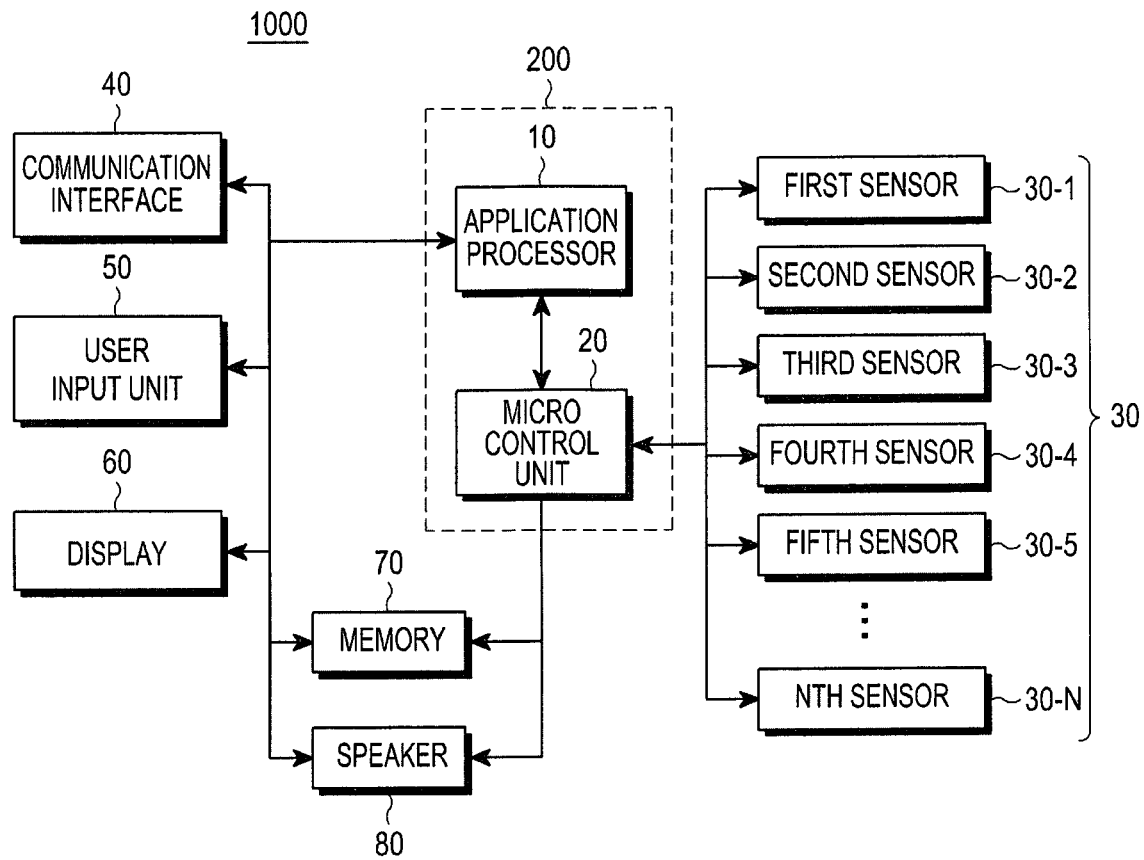
FIG. 5 is a block diagram illustrating a mobile communication terminal including a context recognition apparatus, according to an embodiment of the present invention.

FIG. 5 is a block diagram illustrating the mobile communication terminal 1000 including the context recognition apparatus 100, according to an embodiment of the present invention.

Referring to FIG. 5, the mobile communication terminal 1000 includes the application processor 10, the micro control unit 20, the sensor unit 30, a communication interface 40, a user input unit 50, a display 60, a memory 70, and a speaker 80.

The application processor 10 controls overall operation of the context recognition apparatus 100. If a particular event, which is difficult to handle by the micro control unit 20, occurs when the context recognition apparatus 100 recognizes a current state, then the application processor 10 may handle the particular event.

The micro control unit 20 receives sensor data from the sensor unit 30 and generates or updates state information indicating a current state of the mobile communication terminal 1000 or a user who uses the mobile communication terminal 1000 based on the received sensor data. According to an embodiment of the present invention, the micro control unit 20 may perform the foregoing operation, i.e., may receive the sensor data from the sensor unit 30 and generate or update the state information, once the application processor 10 switches to the sleep mode.

According to an embodiment of the present invention, the application processor 10 and the micro control unit 20 may be implemented in such a way as to be included in a controller 200 of the mobile communication terminal 1000. According to an embodiment of the present invention, the micro control unit 20 may be implemented in the form of a core embedded in the application processor 10. The controller 20, implemented in this way, may control overall operation of the mobile communication terminal 1000. The sensor unit 30 includes sensors 30-1, 30-2, 30-3, 30-4, 30-5, . . . , 30-N. Each of the sensors 30-1, 30-2, 30-3, 30-4, 30-5, . . . , 30-N recognizes a current state, generates sensor data based on the recognized current state, and sends the sensor data to the micro control unit 20.

The communication interface 40 performs wired or wireless communication of the mobile communication terminal 1000. The communication interface 40, according to an embodiment of the present invention, may receive an Assisted Global Positioning System (AGPS) signal or a Wireless Fidelity (WiFi) Positioning System (WPS) signal for location estimation under control of the application processor 10.

The user input unit 50 receives a user input from the user. The user input unit 50, according to an embodiment of the present invention, may receive various user inputs for executing the context recognition function from the user. For example, the user input unit 50 may receive a user input, which requests display of a user's current location on a map from the user. The user input unit 50 may also receive a user input for displaying a current temperature or an atmospheric pressure, or a user input for requesting rotation of a display screen according to a tilt angle of the mobile communication terminal 1000.

The display 60 displays data stored in the mobile communication terminal 1000. The display 60, according to an embodiment of the present invention, may display various data for executing the context recognition function under control of the application processor 10. For example, the display 60 may display a map regarding a place nearby a user or may separately display a user's location on that map.

The memory 70 stores various data for operating the mobile communication terminal 1000. The memory 70, according to an embodiment of the present invention, may store the threshold for the remaining battery capacity, the threshold for the sensor data, the threshold time, i.e., the first reference time, the second reference time, and the third reference time.

The speaker 80 outputs various sounds. The speaker 80, according to an embodiment of the present invention, may output an alarm sound indicating occurrence of the particular event to the user under control of the application processor 10 or the micro control unit 20.

Figure 6:
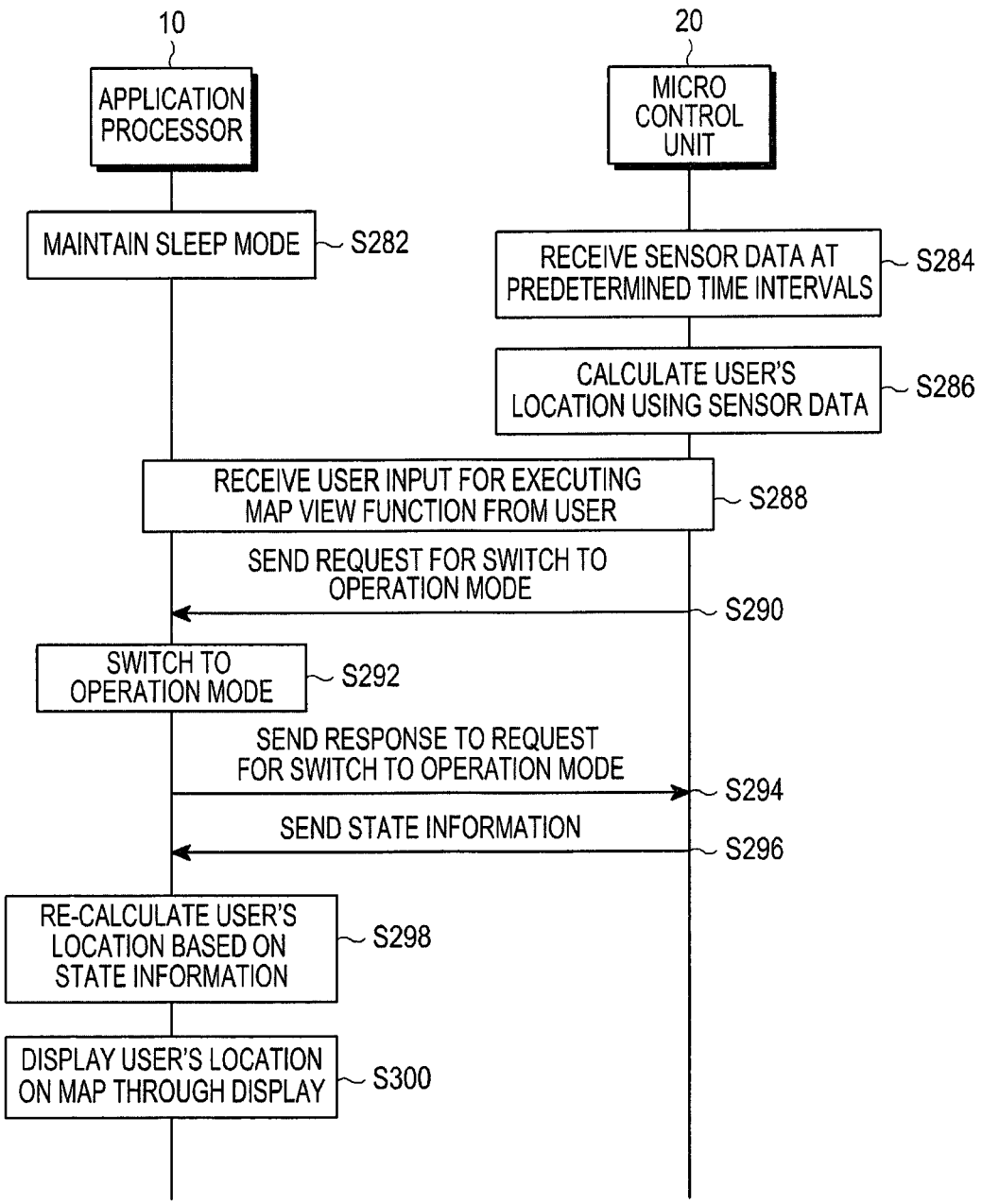
FIG. 6 is a flowchart illustrating a context recognition method in the mobile communication terminal of FIG. 5, according to an embodiment of the present invention.

FIG. 6 is a flowchart illustrating a context recognition method in the mobile communication terminal 1000 of FIG. 5, according to an embodiment of the present invention. In FIG. 6, it is assumed that the application processor 10 is in the sleep mode. In the context recognition method of FIG. 6, the user wants to display the user's current location on the map by using the mobile communication terminal 1000.

Referring to FIG. 6, when the application processor 10 maintains the sleep mode, in step S282, the micro control unit 20 receives sensor data from the sensor unit 30 at predetermined time intervals, in step S284. In an embodiment of the present invention, the micro control unit 20 may receive sensor data from an accelerometer, a gyroscope, a geomagnetic sensor, and a barometer. The micro control unit 20 calculates a user's location by using the sensor data received from the sensor unit 30, in step S286. According to an embodiment of the present invention, the micro control unit 20 may receive the sensor data at predetermined time intervals and repeat the location calculation to update the user's location.

When the micro control unit 20 calculates the user's current location, the user of the mobile communication terminal 1000 may provide a user input for requesting display of the user's location on the map, in step 288. Upon receiving the user input for execution of a map view function from the user through the user input unit 50, the micro control unit 20 sends a request for a switch to the operation mode to the application processor 10, in step S290.

The micro control unit 20 generates state information based on sensor data and controls the speaker 80 to perform an operation requiring relatively simple computation, such as an output of an alarm sound. However, the speaker 80 cannot perform an operation requiring complex computation, such as tracking a region in which the user is currently located to estimate the user's location, and displaying the estimated user's location on the map. Therefore, the micro control unit 20 according to an embodiment of the present invention sends a request to switch to the operation mode to the application processor 10 to control the application processor 10 to process the foregoing operations.

The application processor 10 switches to the operation mode, in step S292, and sends a response to the request for the switch to the operation mode received from the micro control unit 20, in step S294. The micro control unit 20 sends state information to the application processor 10, in step S296. According to an embodiment of the present invention, in step S296, the micro control unit 20 may send the state information or the sensor data received in step S284. The micro control unit 20 sends the state information generated or updated during execution of the operations prior to step S296 to the application processor 10, thereby allowing the application processor 10 to more rapidly calculate the user's current location by referring to the state information.

The application processor 10 re-calculates the user's location based on the state information, in step S298. Once the user's location is calculated, the application processor 10 displays the user's location on the map through the display 60, in step S300.

While it has been described with reference to FIG. 6 that the user's current location is displayed on the map by the mobile communication terminal 1000, the location tracking function of the context recognition apparatus 100 as shown in FIG. 6 may also be applied to other contexts. For example, when the user is on board a bus and the user may make, to the mobile communication terminal 1000, a user input requesting the mobile communication terminal 1000 to inform the user when the bus arrives at a desired bus stop or arrives at a location 1 km ahead of the bus stop. The application processor 10 of the context recognition apparatus 100 calculates state information, i.e., the user's current location, at the instant of user input reception, forwards the calculated user's current location to the micro control unit 20, and then switches to the sleep mode. The micro control unit 20 may continuously calculate the user's location based on the state information forwarded from the application processor 10 or sensor data generated by the sensor unit 30. When the bus, which the user is on, arrives at a location 1 km ahead of the desired bus stop, the micro control unit 20 requests the application processor 10 to switch to the operation mode. The application processor 10 switches to the operation mode at the request of the micro control unit 20. The application processor 10 controls the mobile communication terminal 1000 to turn on the turned-off display screen or output a preset alarm sound, thereby informing the user of an arrival at the desired bus stop.

Figure 7:
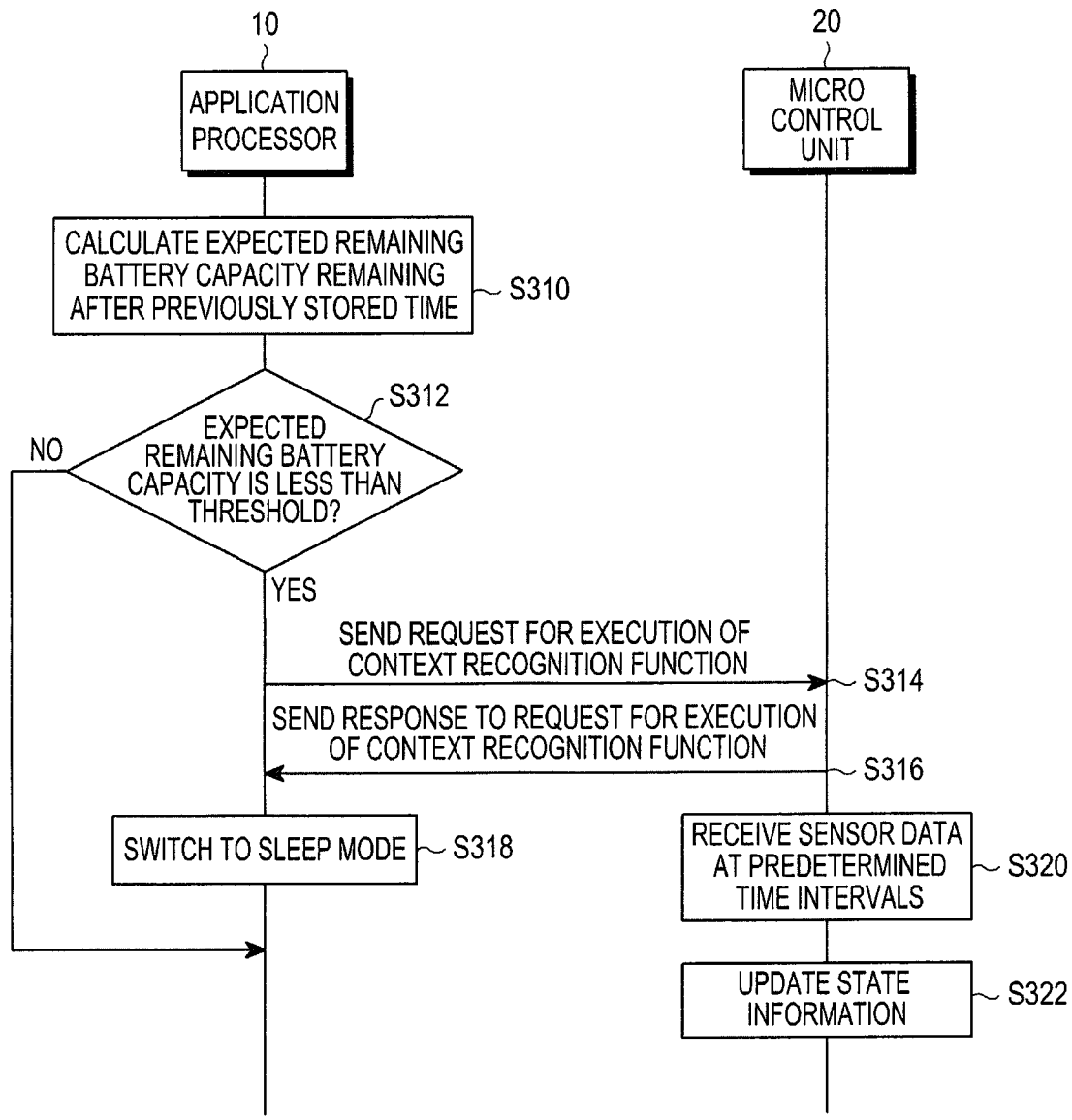
FIG. 7 is a flowchart illustrating a context recognition method in the context recognition apparatus of FIG. 1, according to another embodiment of the present invention.

FIG. 7 is a flowchart illustrating a context recognition method in the context recognition apparatus of FIG. 1, according to another embodiment of the present invention. In FIG. 7, the application processor 10 is assumed to be executing the context recognition function or is assumed to be executing the context recognition function after a previously stored time. It is also assumed that at the current time, the remaining battery capacity exceeds the threshold.

Referring to FIG. 7, the application processor 10 calculates an expected remaining battery capacity remaining after a previously stored time, in step S310. The application processor 10 determines whether the expected remaining battery capacity calculated in step S310 is less than the threshold, in step S312.

The application processor 10 is assumed to previously calculate the remaining battery capacity remaining after, for example, two hours in step S310. It is also assumed that after two hours, the remaining battery capacity is less than the threshold, such that the application processor 10 will need to switch to the sleep mode.

The sensor data collection time interval of the micro control unit 20, according to an embodiment of the present invention, may vary according to the remaining battery capacity. As the remaining battery capacity increases, the processing speed of the micro control unit 20 or the sensor unit 30 increases. Thus, the time interval of sensor data collection of the micro control unit 20 becomes shorter as the remaining battery capacity increases. To allow the micro control unit 20 to generate or update more accurate state information, it is assumed that sensor data needs to collected every at least 10 seconds.

The application processor 10, according an embodiment of the present invention, may compare a sensor data collection interval of the micro control unit 20 at the current time with a sensor data collection interval of the micro control unit 20 at a time instant at which the remaining battery capacity is less than the threshold after two hours. It is assumed that after two hours, the sensor data collection interval of the micro control unit 20 is calculated as '20 seconds'. As described above, to allow the micro control unit 20 to generate or update more accurate state information, the sensor data collection interval needs to be less than '10 seconds'. Specifically, although the application processor 10 switches to the sleep mode at a time instant at which the total remaining battery capacity is less than the threshold after two hours, the micro control unit 20 cannot generate or update accurate state information. Hence, the application processor 10 switches to the sleep mode in advance to prepare for reduction of the remaining battery capacity to below the threshold after two hours, thus saving the battery and improving the accuracy of state information generated or updated by the micro control unit 20.

If the expected remaining battery capacity is less than the threshold (YES in step S312), the application processor 10 sends a request for execution of the context recognition function to the micro control unit 20, in step S314. Specifically, the application processor 10 may generate an execution request message and send it to the micro control unit 20.

The micro control unit 20 having received the request for execution of the context recognition function sends a response to the request to the application processor 10, in step S316. Upon receiving the response to the request sent in step S314, the application processor 10 switches the current state to the sleep mode, in step S318.

The micro control unit 20 collects sensor data at predetermined time intervals, in step S320. According to an embodiment of the present invention, the micro control unit 20 may receive sensor data generated by each of the first through $N^{th}$ sensors 30-1, 30-2, 30-3, . . . , 30-N included in the sensor unit 30 from the sensor unit 30 at predetermined time intervals. In step S322, the micro control unit 20 updates state information based on the sensor data collected in step S320.

As such, the mobile communication terminal 1000, according to an embodiment of the present invention, switches the application processor 10 to the sleep mode in advance, prior to arrival of the remaining battery capacity at the threshold, thereby preventing unnecessary power consumption and increasing the total usage time of the mobile communication terminal 1000.

If the expected remaining battery capacity exceeds the threshold (NO in step S312), the application processor 10 may maintain the current state corresponding to the operation mode without switching to the sleep mode.

Figure 8:
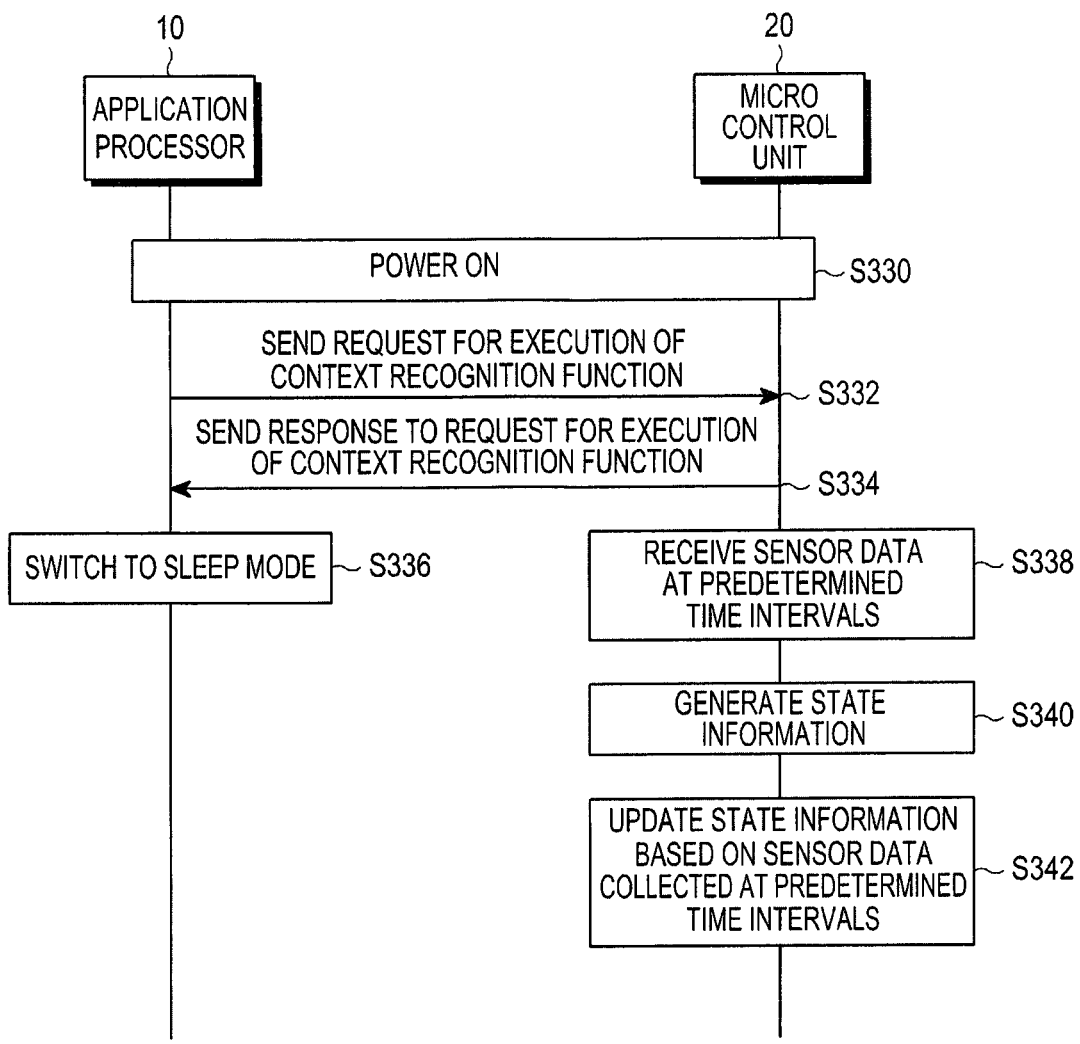
FIG. 8 is a flowchart illustrating a context recognition method in the context recognition apparatus of FIG. 1, according to an embodiment of the present invention.

FIG. 8 is a flowchart illustrating a context recognition method in the context recognition apparatus 100 of FIG. 1, according to another embodiment of the present invention.

Referring to FIG. 8, once the mobile communication terminal 1000, including the context recognition apparatus 100, is powered on in step S330, the application processor 10 sends a request for execution of the context recognition function to the micro control unit 20, in step S332. The micro control unit 20, having received the request for execution of the context recognition function, sends a response to the request for execution of the context recognition function to the application processor 10, in step S334. Upon receiving the response to the request, the application processor 10 switches the current state to the sleep mode, in step S336. As such, the application processor 10 of the context recognition apparatus 100, according to an embodiment of the present invention, may switch the current state to the sleep mode if the mobile communication terminal 1000 is powered on.

Once execution of the context recognition function begins, the micro control unit 20 receives sensor data from the sensor unit 30, in step S338. In step S340, the micro control unit 20 generates state information by using the sensor data received from the sensor unit 30, in step S338. In an embodiment of the present invention, the micro control unit 20 executes the context recognition function as soon as the mobile communication terminal 1000 is powered on. In an embodiment of the present invention, the application processor 10 may send a request for execution of the context recognition function to the micro control unit 20 without generating separate state information.

When the state information is generated in step S340, the micro control unit 20 collects sensor data from the sensor unit 30 at predetermined time intervals. The micro control unit 20 updates the state information based on the sensor data collected at predetermined time intervals. in step S342.

As is apparent from the foregoing description, a context recognition apparatus and method can be provided that are capable of minimizing power consumption of the mobile communication terminal while continuously recognizing a context by using a sensor.

While the invention has been shown and described with reference to certain embodiments thereof, it will be understood by those skilled in the art that various changes in form or detail may be made therein without departing from the spirit and scope of the invention as defined by the following claims and any equivalents thereof.

What is claimed is:

1. An electronic device for correcting an error, the electronic device comprising:
   one or more sensors;
   an application processor configured to execute instructions; and
   a sensor processor configured to:
   control the one or more sensors to obtain sensing information;
   provide state information of the electronic device based on the sensing information obtained from the one or more sensors during a sleep mode, and
   if an expected error or inaccuracy of the state information exceeds a predetermined threshold, transmit, by the sensor processor, the state information to the application processor,
   wherein, one or more errors of the state information is corrected by the application processor during an operation mode.

2. The electronic device of claim 1, wherein the sensor processor is further configured to obtain corrected state information from the application processor in response to the transmitting of the state information.

3. The electronic device of claim 1, wherein the state information includes context information related to a location of the electronic device,
   wherein the context information includes coordinates of the electronic device, information indicating a state of the electronic device, information indicating a state of a user of the electronic device, or information related to a place in which the electronic device is positioned.

4. The electronic device of claim 3, wherein the application processor is further configured to receive a wireless signal related to location information of the electronic device from an external device.

5. The electronic device of claim 4, wherein the application processor is further configured to determine a location of the electronic device based on the wireless signal,
wherein the wireless signal includes information indicating a location of the electronic device based on a Global Positioning System (GPS) or information indicating a location of the electronic device based on s Wireless Fidelity (WiFi) Positioning System (WPS).

6. The electronic device of claim 5, wherein the wireless signal includes an Assisted Global Positioning System (AGPS) signal or a WPS signal.

7. The electronic device of claim 6, wherein the expected error or the inaccuracy of the state information is corrected based on the AGPS signal, the WPS signal, or the state information.

8. The electronic device of claim 1, wherein, after the expected error or the inaccuracy of the state information is corrected by the application processor, if a predetermined condition is satisfied, an operation mode of the electronic device is switched to the sleep mode.

9. The electronic device of claim 8, wherein,
(i) if a remaining power of a battery of the electronic device is less than a threshold, or (ii) if a user input has not been inputted by at least a preset time, it is determined that the predetermined condition is satisfied.

10. A method for obtaining state information of an electronic device, the method comprising:
controlling, by a sensor processor of the electronic device, one or more sensors to obtain sensing information;
providing, by the sensor processor, state information of the electronic device based on the sensing information obtained from the one or more sensors during a sleep mode; and
if an expected error or inaccuracy of the state information exceeds a predetermined threshold, transmitting, by the sensor processor, the state information to an application processor,
wherein, one or more errors of the state information is corrected by the application processor during an operation mode.

11. The method of claim 10, further comprising:
receiving, by the sensor processor, corrected state information from the application processor in response to the transmitting of the state information.

12. The method of claim 10, wherein the state information includes context information related to a location of the electronic device,
wherein the context information includes coordinates of the electronic device, information indicating a state of the electronic device, information indicating a state of a user of the electronic device, or information related to a place in which the electronic device is positioned.

13. The method of claim 12, further comprising:
receiving, by the application processor, a wireless signal related to location information of the electronic device from an external device.

14. The method of claim 13, further comprising:
determining a location of the electronic device based on the wireless signal,
wherein the wireless signal includes information indicating a location of the electronic device based on a Global Positioning System (GPS) or information indicating a location of the electronic device based on a Wireless Fidelity (WiFi) Positioning System (WPS).

15. The method of claim 14, wherein the wireless signal includes an Assisted Global Positioning System (AGPS) signal or a WPS signal.

16. The method of claim 15, wherein the expected error or the inaccuracy of the state information is corrected based on the AGPS signal, the WPS signal, or the state information.

17. The method of claim 10, wherein, after the expected error or the inaccuracy of the state information is corrected by the application processor, if a predetermined condition is satisfied, an operation mode of the electronic device is switched to the sleep mode.

18. The method of claim 17, wherein,
(i) if a remaining power of a battery of the electronic device is less than a threshold, or (ii) if a user input has not been inputted by at least a preset time, it is determined that the predetermined condition is satisfied.

* * * * *